United States Patent
Maurin et al.

(10) Patent No.: US 9,173,056 B2
(45) Date of Patent: Oct. 27, 2015

(54) HYBRID METHOD FOR HIGH ACCURACY AND COST-EFFECTIVE PREDICTION OF MOBILE DEVICE POSITIONS THROUGH MOBILE NETWORKS

(71) Applicant: Creativity Software Ltd., Kingston-upon-Thames, Surrey (GB)

(72) Inventors: Denis Alain Maurin, New Malden (GB); Irving Dindoyal, London (GB)

(73) Assignee: Creativity Software Ltd., Kingston-Upon-Thames (GB)

( * ) Notice: Subject to any disclaimer, the term of this patent is extended or adjusted under 35 U.S.C. 154(b) by 0 days.

(21) Appl. No.: 13/775,054

(22) Filed: Feb. 22, 2013

(65) Prior Publication Data
US 2013/0217418 A1    Aug. 22, 2013

(30) Foreign Application Priority Data
Feb. 22, 2012 (GB) .................................. 1203095.3

(51) Int. Cl.
H04W 24/00 (2009.01)
H04W 4/02 (2009.01)

(52) U.S. Cl.
CPC ........................................ *H04W 4/02* (2013.01)

(58) Field of Classification Search
CPC ........................................................ H04W 4/02
USPC ....................... 455/456.3, 456.2, 456.1, 456.5
See application file for complete search history.

(56) References Cited

U.S. PATENT DOCUMENTS

| 6,362,783 | B1 | 3/2002 | Sugiura et al. | |
|---|---|---|---|---|
| 2010/0227626 | A1* | 9/2010 | Dressler et al. | 455/456.1 |
| 2011/0051658 | A1* | 3/2011 | Jin et al. | 370/328 |
| 2012/0258729 | A1* | 10/2012 | Siomina et al. | 455/456.1 |

FOREIGN PATENT DOCUMENTS

| GB | 1203095.3 | 2/2012 |
|---|---|---|
| WO | 2008/021979 A2 | 2/2008 |

* cited by examiner

*Primary Examiner* — Opiribo Georgewill
(74) *Attorney, Agent, or Firm* — Galvin Patent Law LLC; Brian R. Galvin

(57) ABSTRACT

A method for determining the geographical location of a network-connected mobile device comprising a hybrid approach that further comprises both the utilization of strength or time delay signals and a database of fingerprints taken throughout the network area.

6 Claims, 11 Drawing Sheets though this is prone to error when the paths to different base stations have different signal loss characteristics. If the path to one base station is clear line of sight while that to another is obstructed by trees and that to

HYBRID METHOD FOR HIGH ACCURACY AND COST-EFFECTIVE PREDICTION OF MOBILE DEVICE POSITIONS THROUGH MOBILE NETWORKS

CROSS-REFERENCE TO RELATED APPLICATIONS

This application is the national stage entry for, and claims priority to, United Kingdom patent application serial number GB 1203095.3, filed on Feb. 22, 2012 and titled, "Hybrid Method For High Accuracy And Cost Effective Prediction Of Mobile Device Positions Through Mobile Networks", the entire specification of which is incorporated herein by reference.

BACKGROUND OF THE INVENTION

1. Field of the Invention

The invention relates to the field of mobile communications, and more particularly to the field of locating a particular mobile device on a mobile telecommunications network.

2. Discussion of the State of the Art

For a mobile telephone system to work, the appropriate transmitter tower (or base transceiver station, "BTS", also known commonly as a "base station" in the art), must transmit the telephone call to the user's device (which may be a mobile phone, tablet computing device, or any of a variety of electronic devices designed to communicate via a wireless radio network). Mobile phone systems therefore continuously track the "cell" a device is currently in. This basic, required knowledge of the location of a handset is limited to the "Cell ID", or an identifier of a specific transmitter to which a device is connected, and simply determines the geographical area served by that transmitter.

However, the location of a mobile device is also of use in other ways: for example, emergency services may need to be able to locate the position of a caller when responding to a call for help; law enforcement or intelligence agencies may wish to track the location of a suspected criminal or terrorist; or location-based commercial services may desire to know a precise location of a mobile phone (and its user) in order to target specific services to the user based on her location. Increasingly, a number of commercial services also rely on, or are enhanced by, knowing the location of a mobile device. For example, these may allow individuals to locate each other, to find nearby businesses or services etc. and thereby increase the value of any such device or service provider.

As the geographical extent of a mobile phone cell can encompass many square kilometers, a more precise estimate of the device's location may be required for the optimum provision of such location-based services ("LBS"). LBS location algorithms can be split in two main categories, as described below.

Predictive Methods:

the goal is to predict the distance from one or more BTS to a mobile device using received signal information and then calculate the position of the device through triangulation (or, more generally, multilateration) or simple calculation.

The strength of a signal from one or more BTS may be available (and from this, along with the antenna orientation and propagation pattern, the distance, and angle from any particular cell may be inferred), though this is prone to error when the paths to different base stations have different signal loss characteristics. If the path to one base station is clear line of sight while that to another is obstructed by trees and that to a third is through a built-up area, then the loss characteristics of these paths vary, making direct comparison of signal strength problematic.

There may also be timing information available that allows distance to a base station to be inferred from the time taken for the signal to pass between handset and base station. The simplest approach to this uses the Timing Advance parameter that is an integral part of Global System for Mobile Communication ("GSM") networks. To ensure accurate timing of the signals as received at a base station, a mobile device will adjust the time at which it starts to transmit in its allocated timing slot by between zero and 63 times 3.69 microseconds. Each such delay compensates for a round-trip of 1100 meters and hence corresponds to an additional 550 meters between handset and BTS.

Other technologies such as Uplink Time Difference of Arrival ("U-TDOA") utilize more precise timing information instead of signal levels but require location measurement units ("LMUs") to be added throughout the mobile network infrastructure. These measure the timing of received signals more precisely than the inherent GSM Timing Advance accuracy, thus allowing a more accurate determination of a device's position. These techniques provide what is known as Enhanced Cell ID ("ECID").

Predictive methods such as ECID usually lead to poor results in urban areas because the prediction easily becomes unreliable due to reflections and multipath propagation effects. In other words, the predicted signal level does not accurately match the observed values. This method is, however, very simple to implement and leads to more acceptable results in rural environments and open areas where both the prediction is more reliable and the need for accuracy is somewhat reduced for most commercial and non-commercial applications. Accuracy may also suffer due to changes between the time a fingerprint was stored and the current time in which a location is being determined, such as new construction or landscaping in an urban area, or variations in signal caused by electromagnetic interference as may be common in developed areas with a high density of electronic devices.

U-TDOA methods, by contrast, offer high accuracy even in urban areas but suffer from a high implementation cost due to the deployment of LMUs to all BTS and the necessary associated maintenance costs. The accuracy is also affected by reflections and propagation effects, although less so than power based methods.

RF Fingerprinting:

this approach is to take data points on the ground with a Global Positioning System ("GPS") enabled device and build a database of "fingerprints", each of which specifies a location and the signal strength of the various transmitters that can be received at that location. A matching algorithm is then used to find the closest fingerprint and deduce the position of the handset.

Radio frequency ("RF") fingerprinting methods are based on the same radio information as ECID (e.g. cell id, timing advance, signal level (GSM), or similar in other mobile networks such as Code Division Multiple Access (CDMA) and 3G networks), but rely on a large number of data points being collected at short intervals (known as "heavy drive testing" since these are normally obtained by driving a car equipped with the appropriate measurement equipment to each point) to build an adequate database of data points. This approach gives good accuracy in urban environments and avoids the need for hardware deployment on the radio network. The cost of ownership is, however, significant because of the need for initial and ongoing drive testing and updating of the fingerprint database as new transmitters are added, as buildings go up or vegetation grows or is cut down.

What is needed is a solution that provides the high accuracy of these two approaches without the heavy cost of hardware (in the case of U-TDOA) or of extensive drive testing (in the case of RF fingerprinting).

SUMMARY OF THE INVENTION

Accordingly, the inventor has conceived and reduced to practice, in a preferred embodiment of the invention, a hybrid method which brings the predictive and RF fingerprinting methods together in a hybrid framework in order to minimize the need for drive testing and enhance the accuracy. The invention uses a predictive matching method that is designed to minimize the need for data collection by adding a predictive element thus reducing the cost and maintenance of the solution for the same or better accuracy. The method is applicable to all radio networks (GSM, UMTS, CDMA, LTE) common in the art and may be readily implemented with alternate network technologies that may be developed, as well as additional positioning methods such as Wi-Fi or Assisted GPS ("AGPS") for example. This method can be applied to all LBS services whether commercial or government driven (such as emergency services or lawful interception). Significant benefits of such an approach may include, but are not limited to:

High accuracy (exceeding that of RF fingerprinting);
Availability across networks with or without fingerprinting;
Resilience where the fingerprint database grid is incomplete or outdated; and
Low cost of ownership through limited drive testing and pure software solution.

According to a preferred embodiment of the invention, a system typically operates in two phases. First, expected reception characteristics at each point in a grid (of appropriate resolution) are calculated. This may be done by combining predicted reception at each point with that recorded from any nearby fingerprint data. Predicted reception may take into account the type of terrain through which a signal is travelling, for example using two- and/or three-dimensional maps. A weight given to each fingerprint may be assigned according to the distance from each location to the nearby fingerprinted locations.

Then, when a particular mobile handset is to be located, the radio signal reception characteristics reported from that device and/or the network might be matched to the expected characteristics in order to determine the best match. Matching is performed initially on the basis of rough location information, such as that obtainable by combining cell identification with the known position of a BTS serving that cell. Additional information such as timing advance, antenna orientation and spread may be used to refine a potential location further. Within that region, an error function may be used to find the most likely location (i.e. that location where the predicted reception characteristics most closely match the reported characteristics).

According to a preferred embodiment of the invention, a mobile device may be connected to a mobile communications network (such as a GSM or CDMA cellular network, or any of a multitude of similar radio-based communications networks as may be found in the art), communicating via a plurality of radio transceivers according to the network's specific architecture. A location server may operate within the network, such as a physical server operated by a mobile service provider or a third party, which may be further connected to a data storage system such as a database or network-based cloud storage. It should be appreciated that the physical location of such devices may vary according to the invention, such as a leased data storage service such as are common in the art. When a device's location is requested, a location server may access stored data such as existing RF fingerprints or other location-based data, and compare it to current network conditions on a mobile device to attempt to find a match. A device may also be used to detect current network conditions to attempt to locate it actively via algorithmic methods described in greater detail below, and a location server may then return the resultant data from the use of both location methods to the initial requestor.

According to a further embodiment of the invention, a system as described above may operate utilizing a location processor within a mobile device, which may be used by a device to actively determine its own location without necessitating the use of network-side processing by a location server. A database or storage medium may still operate on the network to store existing fingerprints or other location data, which may then be served to a mobile device when requested and mobile device may also store new data with the network storage, such as when a device is used to record new RF fingerprints for later use in determining location information.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
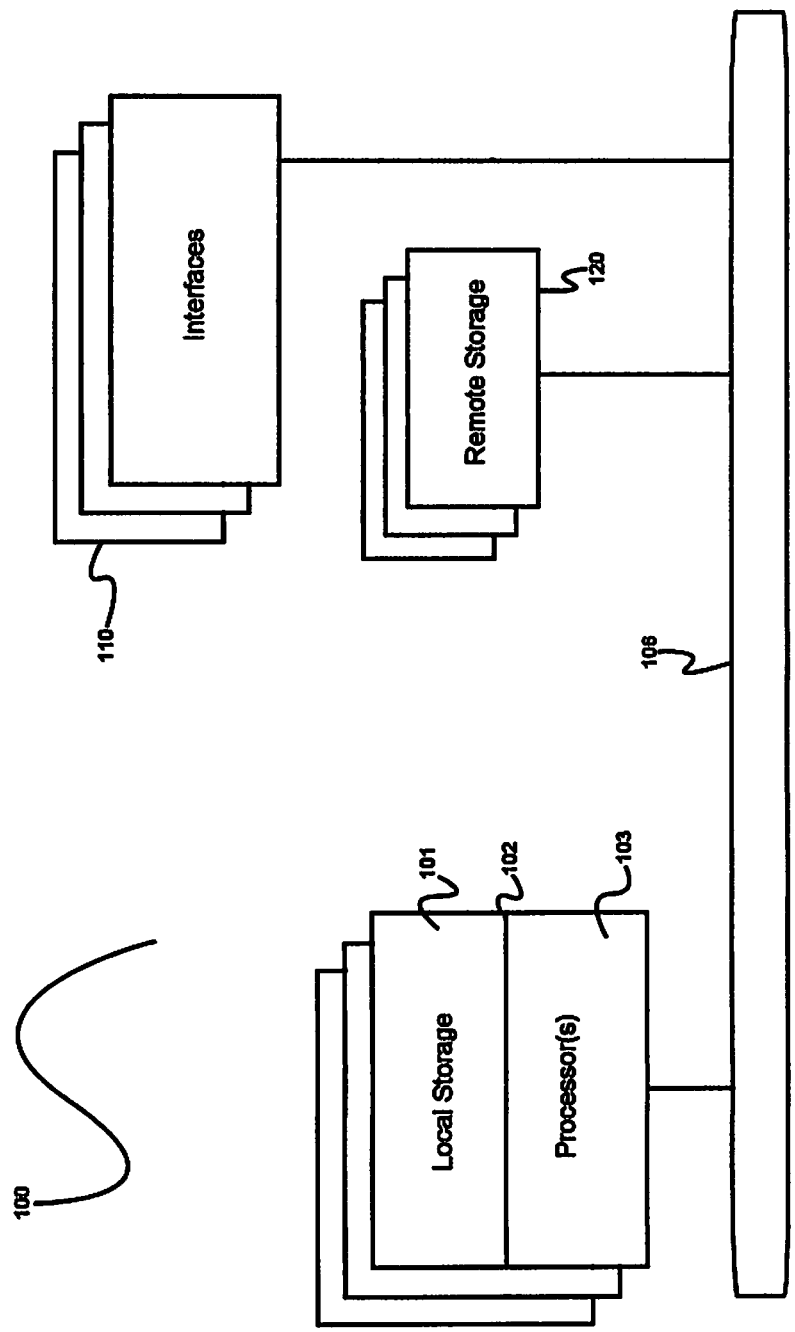
FIG. 1 is a block diagram illustrating an exemplary hardware architecture of a computing device used in an embodiment of the invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, a "cellular communications tower" (also herein referred to as a "tower" or a "cell") refers to any of a variety of designs of mobile communications transceiver nodes which may receive and/or send radio transmissions to and from mobile devices on a network, and which may or may not be implemented as physical towers (although such a physical configuration is common in the art). Such nodes may also be known as base transmission stations (BTS), transmitters, or simple "base stations", and such terms may be used interchangeably herein.

As used herein, "mobile device" refers to any of a variety of electronic devices designed to be portable and able to communicate on a wireless network such as a cellular telecommunications network, Wi-Fi, Bluetooth™, or other such wireless network, such as a mobile telephone, personal digital assistant (PDA), tablet computing device, laptop personal computer, or other device. It will be appreciated that a wide variety of such devices are common in the art, and that new devices may become available and may be utilized according to the invention, and that any references herein to a specific type of mobile device should not be construed as limiting of the invention in any way, and that any mobile device which may be capable of wireless communications may be utilized according to the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
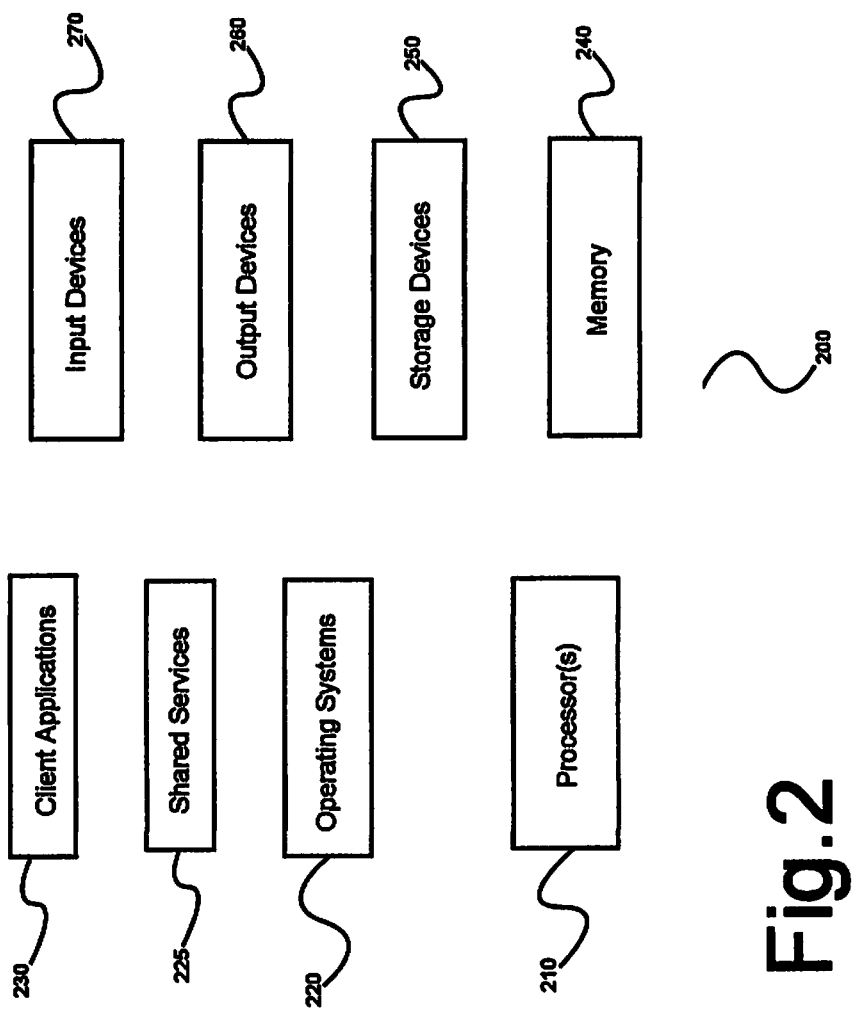
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
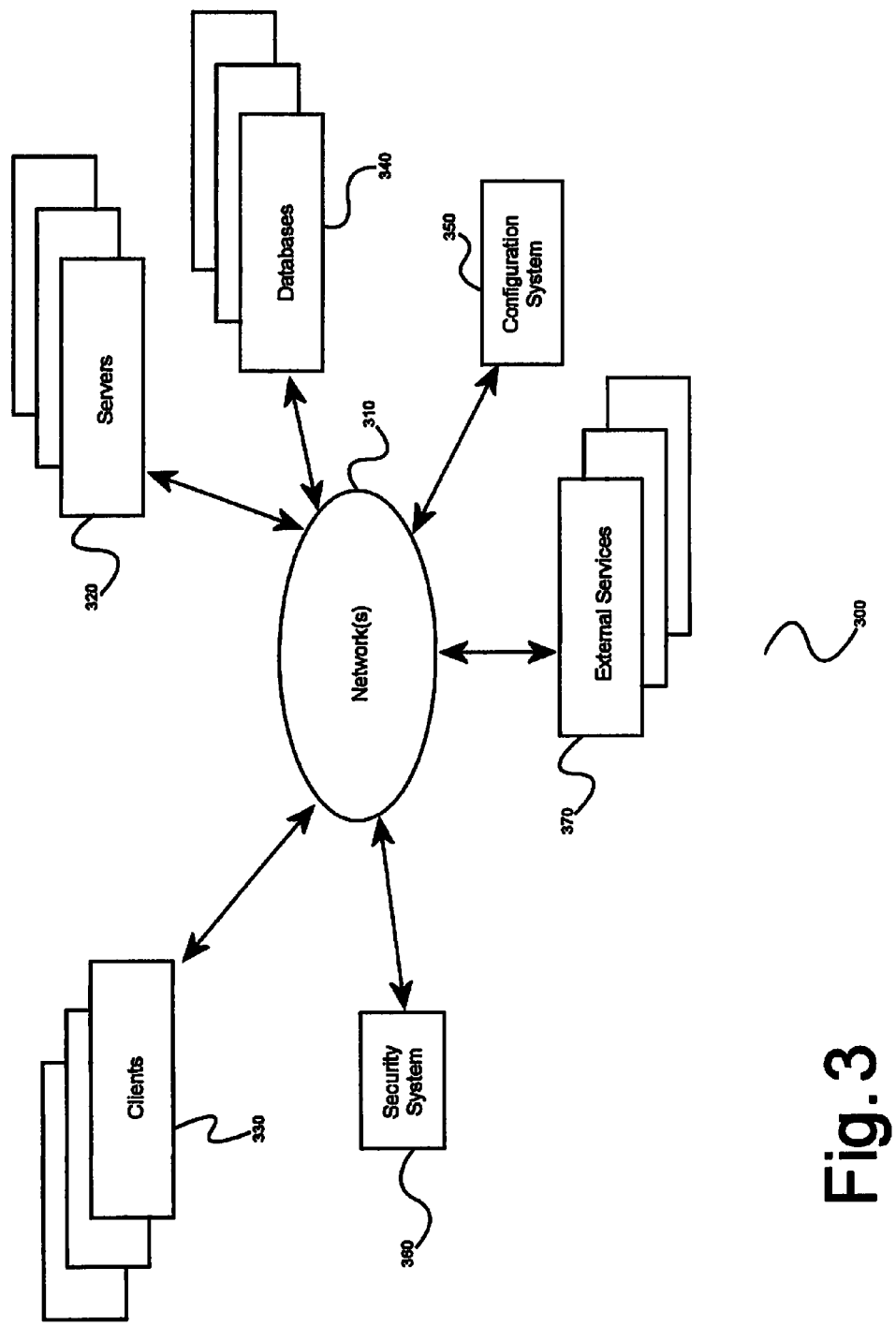
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

The system of the invention typically operates in two stages. Expected characteristics of reception at each point in a grid may be calculated in advance from known locations of a BTS, a (typically) known direction in which each antenna is pointed (its azimuth) and the angle it serves, or any mapping data available and any measured fingerprint data.

It will be appreciated that a system could operate exclusively in real time, with the characteristics of the points on the grid being calculated only when required. Such an approach could be further optimized by only calculating the reception characteristics for a subset of locations, the said subset being determined from the approximate location data provided (for example, cell ID and timing advance). However, for optimum response time, it is normal for the time consuming calculations required by a fairly dense grid to be performed prior to the system being used for live location determination.

Note that, while the system is described with regard to a cellular mobile phone network (whether GSM, UMTS, CDMA, LTE or any of a variety others which may be found in the art), it is equally applicable to other radio networks such as emergency services "walkie-talkie" networks that may be utilized according to the invention. On any radio system with multiple transmitters, the location can be determined by analyzing reception from any or all transmitters in range. It can also be deployed on a system with a single transmitter though the resultant location will typically be less accurate and may be so broad as to form an annular ring around the transmitter.

The first phase, creation of the expected reception characteristics at many locations, will now be described.

Although older, empirical algorithms such as the Hata Model are still present in the network planning tools proposed by the various telecom vendors, these are steadily being replaced by better tools that leverage both two- and three-dimensional maps and hence can make use of two- and three-dimensional ray tracing technologies. As a result, instead of performing a direct and very unreliable prediction of the signal level using an empirical formula or a simple fitting function, the environment may be taken into consideration. This helps to produce more accurate signal predictions, especially in dense urban areas where radio waves are subject to attenuation, reflection, multi-path propagation, etc. The solution disclosed herein leverages two-dimensional maps as a standard but provides even better performance when three-dimensional (topographical) data is used.

The accuracy of the model can be further enhanced by adjusting or calibrating the parameters of the model to provide the optimum fit to field measurements taken in the particular types of environment. For example, the propagation characteristics of a dense housing estate would be different from that of a leafy suburb where properties are more widely spaced. Measurements taken in specific cities allow the parameters for urban areas to be more closely matched to those of the particular city, thus taking account of building height, density and construction methods.

The invention requires (i) details of the transmission equipment within the network; (ii) a two (though preferably three) dimensional model of the geographical area covered by the mobile network across which the location based system is to operate; and (iii) a database of at least some fingerprint information. For best results, the map should provide categorization of the terrain, allowing the path between any two points to be sub-divided into measurable lengths of each type of terrain, such as urban, forested, open space. In addition to the location and cell identification of each BTS, the details of transmission equipment typically include antenna direction (azimuth) and angle served for each transmitter within the network. There are typically three antennae on a BTS, each covering a 120° "sector" or a single, omnidirectional antenna covering 360° degrees. Other permutations are used but are less common.

The combination of the terrain classification from the model (ii), when combined with the network data (i), allows calculation of a predicted reception profile at any point within the network region. Each fingerprint in (iii) provides a measured reception profile for a specific location, for which the longitude and latitude are known or can be derived from whatever co-ordinate system is used in (iii).

The data provided by each of these approaches is combined in order to provide a more accurate prediction of the reception profile at points between and around the fingerprinted locations. This is achieved by modulating individual measurements that appear not to match the characteristics that have been measured near to them. In other words, the method takes into account the local influence of the fingerprint measurement points and hence modulates and extends the already advanced predictive, environment-aware model.

Figure 4:
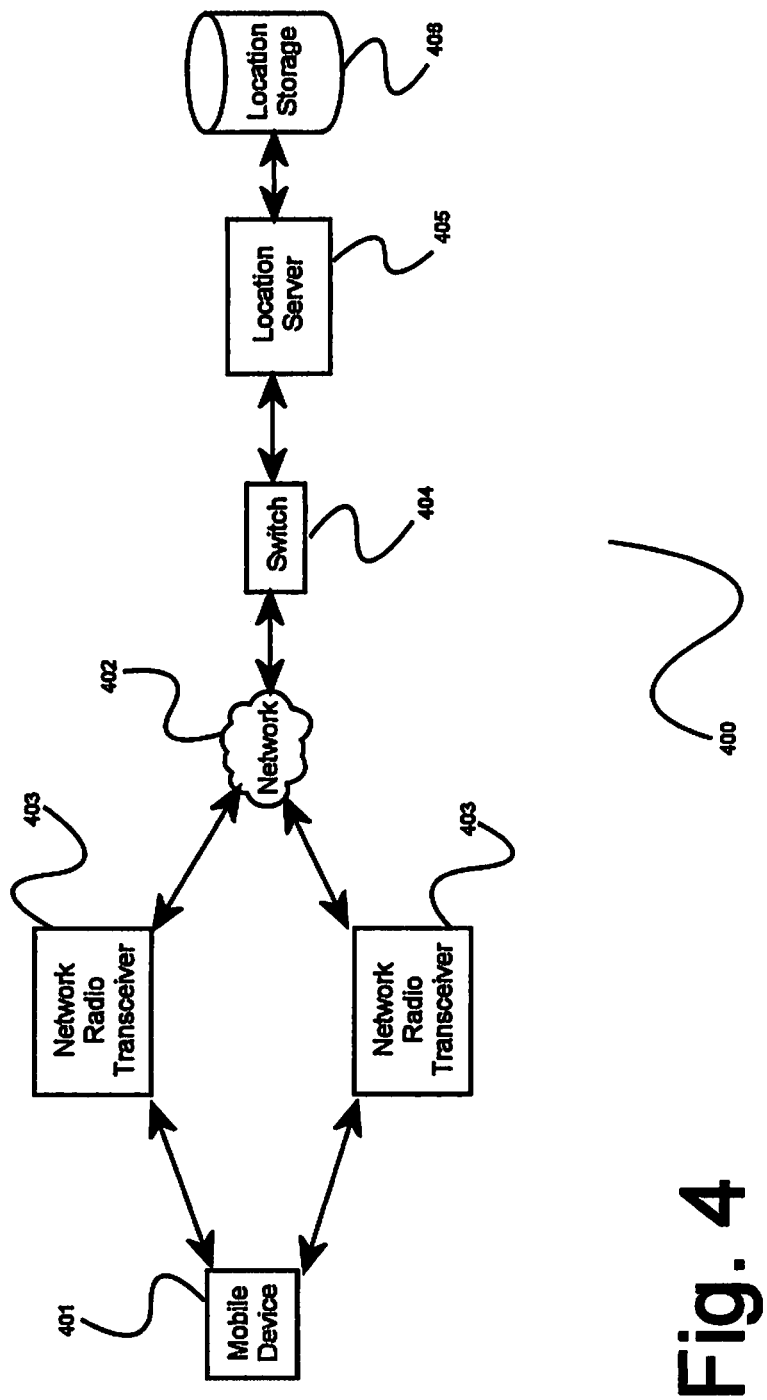
FIG. 4 is a block diagram of an exemplary system architecture utilizing a network-based location server, according to a preferred embodiment of the invention.

FIG. 4 is a block diagram of an exemplary system architecture 400 for location detection, according to a preferred embodiment of the invention. As illustrated, a mobile device 401 may be connected to a mobile communications network 402 via a plurality of radio transceivers 403. Network 402 may be of varied architecture, such as GSM or CDMA radio communications networks or any of a variety of similar networks common in the art. Transceivers 403 may be physical towers as traditionally conceived when referring to mobile networks, or may of varied physical construction including (but not limited to) mobile cellular "hot spots" or semipermanent transceiver devices not in a traditional "tower" form such as those used onboard aircraft or ships for crew members and passengers to use mobile devices away from land-based network towers.

A mobile device 401 may be in communication with a network switch 404, which may relay data or voice communications and which may be further connected to a location server 405. Location server 405 may be a dedicated physical device such as a computing device or it may be a software element operated on a physical device, and such a server 405 need not be collocated with other elements of a communications network—for example, it might be a network-attached but remotely operated device leased from a third-party vendor and accessed over a network 401 in much the same way as cloud-based storage solutions commonly utilized in the art. Location server 405 may in turn be further connected to a database 406 or similar datastore, which may be used for storage and retrieval of known location-based data such as RF fingerprints described above. In this manner, a network-side location server 405 may serve requests for location-based data to any mobile devices 401 connected via a network 402, such as when a device requests a location (such as may be commonly desired for positioning a user on a map viewed on a device's display) or when it may be desirable to locate a device remotely (that is, without having the device physically available), such as for emergency services or law enforcement applications.

It should be appreciated that such an arrangement may have a variety of uses and specific implementations and may incorporate additional or alternate elements than those illustrated, and that such elements as illustrated are exemplary in nature and arrangement and additional or alternate embodiments may be utilized according to the invention.

Figure 5:
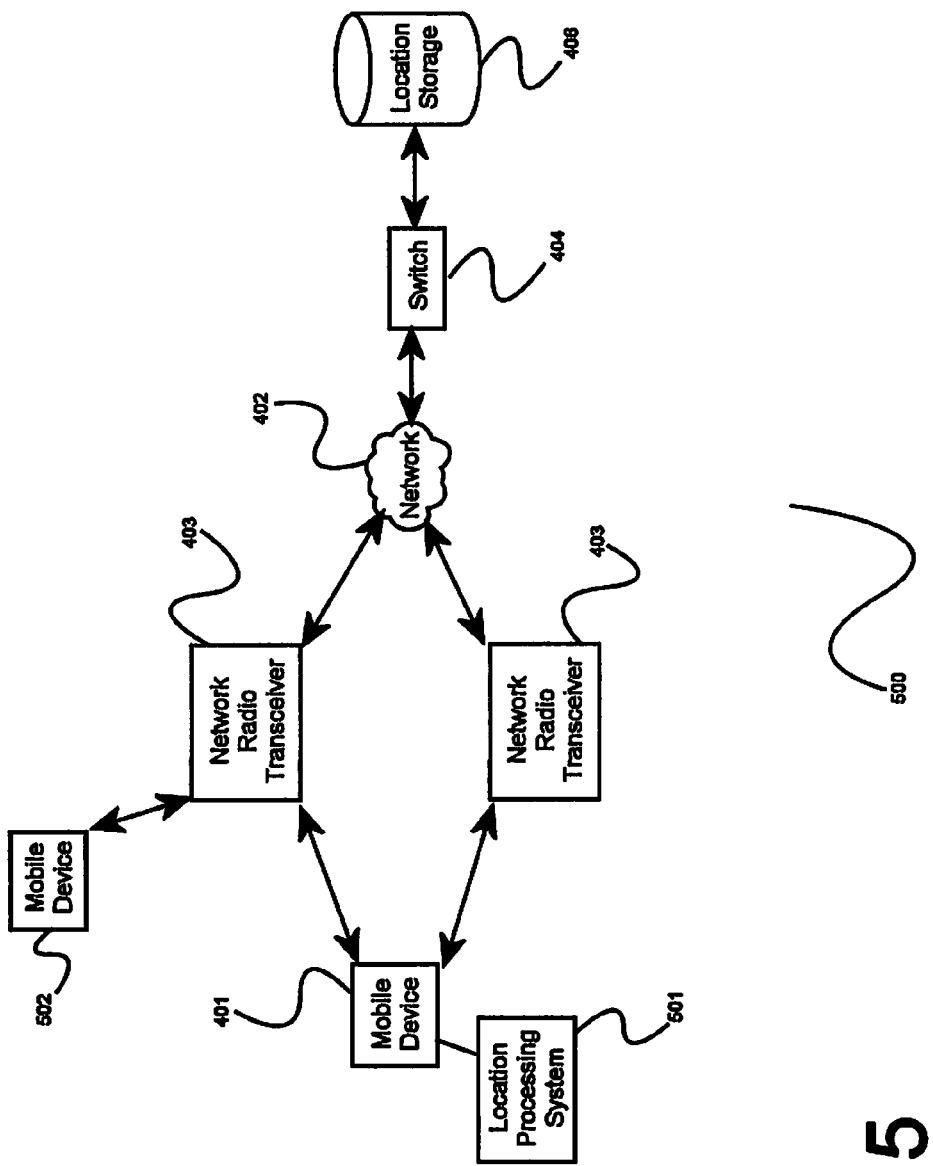
FIG. 5 is a block diagram of an exemplary system architecture utilizing a location processor operating within a mobile device.

FIG. 5 is an illustration of an exemplary system architecture 500 for location detection, according to a further embodiment of the invention. As illustrated previously (referring now to FIG. 4), a mobile device 401 may be connected via a plurality of radio transceivers 403 to a communications network 402. Network 402 may be of varied technology or construction, such as a CDMA or GSM cellular communications network, or any other of a variety of network types common in the art. According to the embodiment, a location processing system 501 may operate on or within a mobile device 401, and may be of varied construction such as a physical GPS device attached to a mobile device 401, or a software-based app running on a device such as a smartphone or tablet computing device as are common in the art.

According to the embodiment, such an arrangement may be beneficial for a device 401 which may be used to locate itself (such as for viewing a device's location on a map, as described previously) or in cases where a device 401 may determine its own location and broadcast or send it to another device 502 (such as may be desirable for social interaction or other applications where a user may wish to make their location known to others) or to a network-connected storage such as a database 406 or other data storage medium, such as may be desirable for a device being used to take RF fingerprints as described previously, or for storing locations for other purposes such as a GPS "breadcrumb" functionality, wherein a user may view a trail or series of previous locations to determine a route or path followed.

Figure 6:
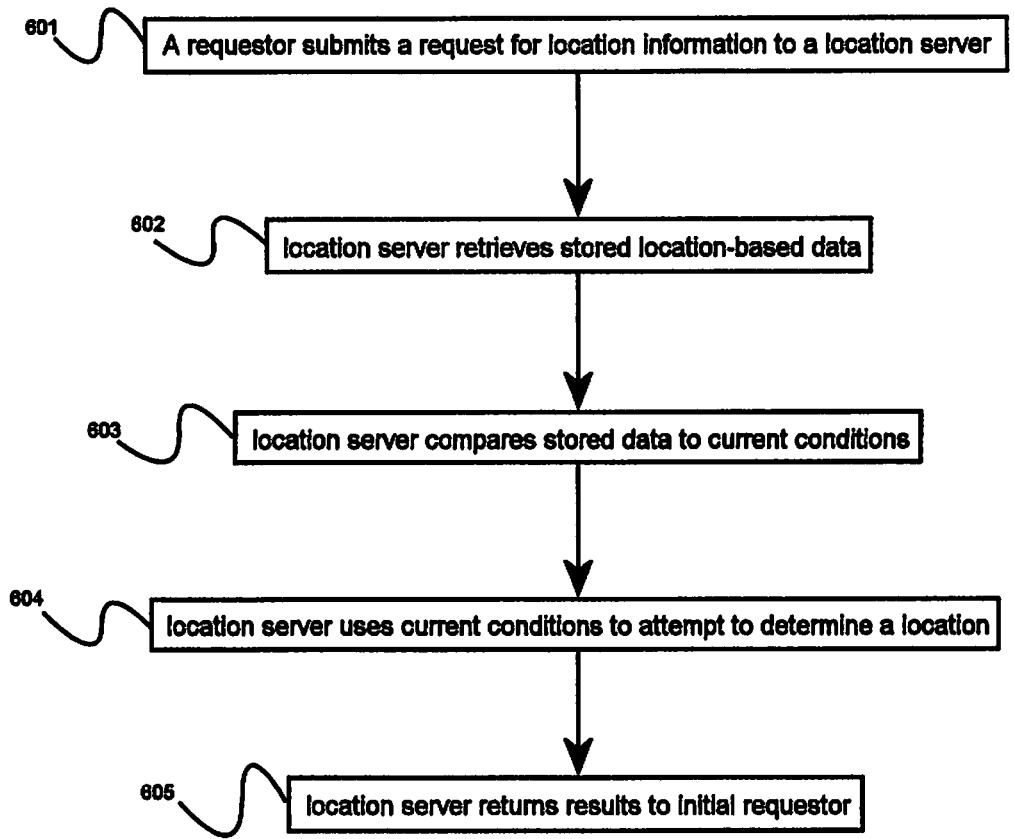
FIG. 6 is a block diagram illustrating an exemplary method for determining a device's location using a network-based location server, according to a preferred embodiment of the invention.

FIG. 6 is an illustration of an exemplary method for determining a device's location from a network-based location processor (as illustrated above, referring to FIG. 4). As illustrated, in a first step 601a location is requested from a network-connected location server. In a next step 602, a location server may retrieve known location-based data from a datastore such as RF fingerprints. In a next step 603, existing location-based data may be compared to current information to determine if it is relevant and accurate, i.e. comparing a fingerprint to current network conditions to determine which fingerprint is the closest match (if any). In a next step 604, a location server may use current information such as network connectivity or signal strength of a device to determine its location. In a final step 605, a location server may then relay resulting information to a requestor, which may be any physical or software-based system which might request a device's location (such as, for example, a device attempting to determine its own location for displaying on a map, or an emergency services operator attempting to locate a device).

Figure 7:
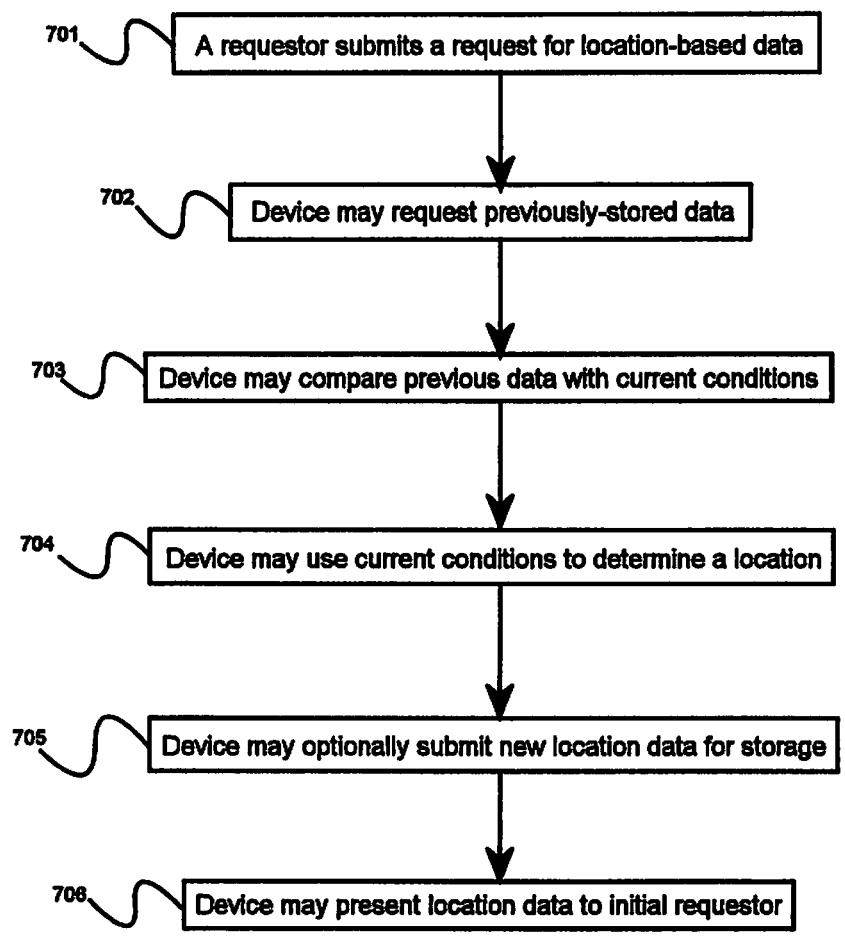
FIG. 7 is a block diagram illustrating an exemplary method for determining a device's location using a location processor operating within a mobile device.

FIG. 7 is an illustration of an exemplary method for determining a device's location using a location processor operating on or within the device. In an initial step 701, a requestor may submit a request for location-based data (such as choosing to view a device's location on a map). In a next step 702, a device may request previously-stored location-based data (such as RF fingerprints described previously) from a network. In a next step 703, known location-based data may be compared against current conditions such as network connectivity or signal strength to determine a match (i.e., which fingerprint is the closest match if any). In a next step 704, a location processor may use current conditions to attempt to determine a location, and in an optional step 705 this new data may be returned to the network for storage (i.e., recording a new fingerprint for future use in location requests). In a final step 706, the resultant location information may be presented to an initial requestor, completing the request for location-based information.

DETAILED DESCRIPTION OF EXEMPLARY EMBODIMENTS

Figure 8:
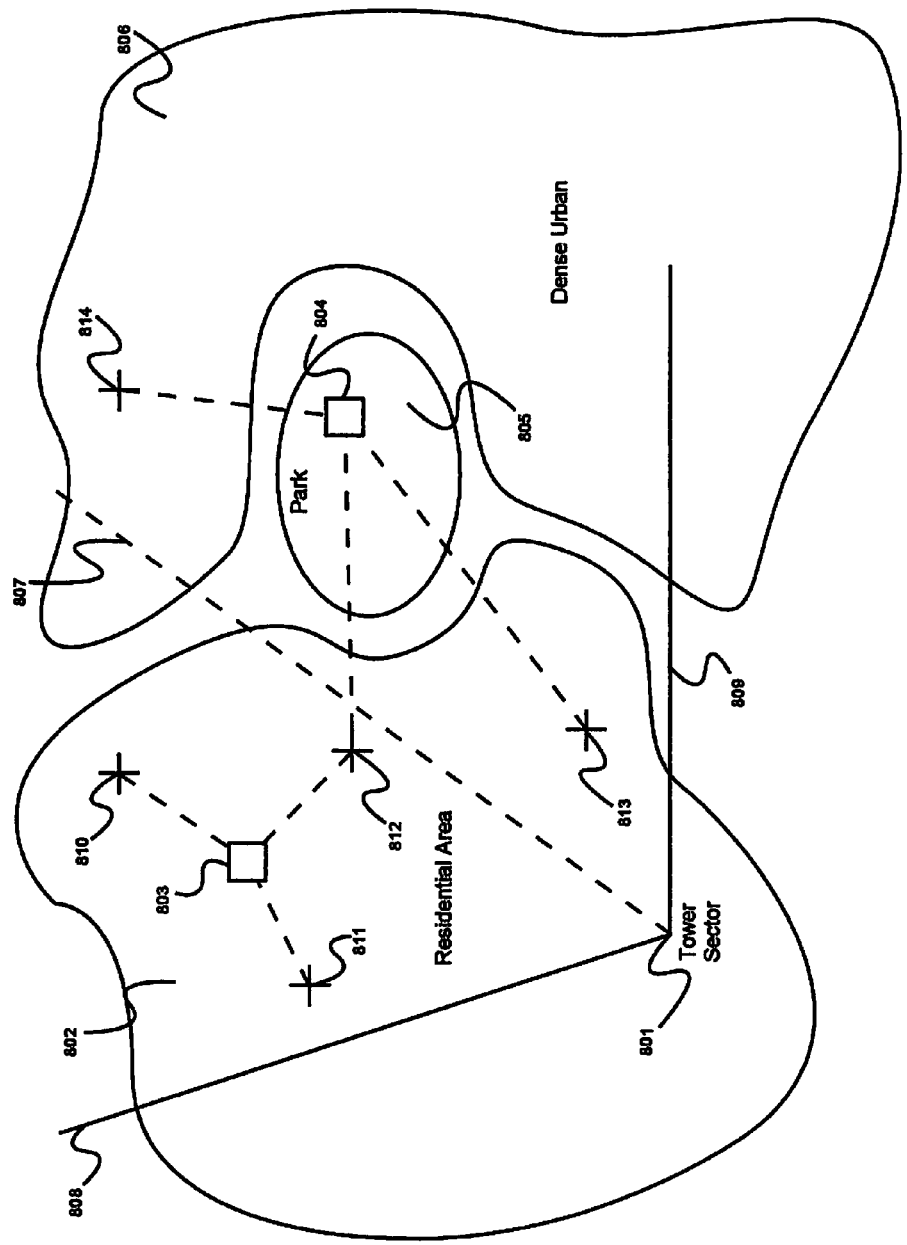
FIG. 8 is a diagram illustrating an area served by one antenna on a base station.

FIG. 8 is an illustration of an exemplary network area according to an embodiment of the invention, showing a BTS 801 located within a residential area 802 and two exemplary points at which a mobile handset might be when a request is received to locate it, and which are described in detail below with respect to the method of the invention. One point 803 may be in a same residential area 802 while another other 804 may be in an open space 805 on the edge of a dense urban area 806 (e.g., a large park as illustrated; however, any sufficiently open area may be utilized according to the invention). An antenna serving this area may be pointed in the direction illustrated 807 and serves a sector delimited by the lines 808, 809. The crosses, 810, 811, 812, 813, 814 as illustrated represent locations at which fingerprint data has been recorded and hence where actual reception profiles are known, according to the exemplary network of the embodiment.

The goal is to pre-calculate a very dense grid based on a limited number of available fingerprints, tower information, and predictive models. Points 803 and 804 represent squares centered on a calculation location within this grid. An array of data objects stores the expected reception profile for each such point on the map. The expected reception profile at each point is calculated as described below.

Figure 9:
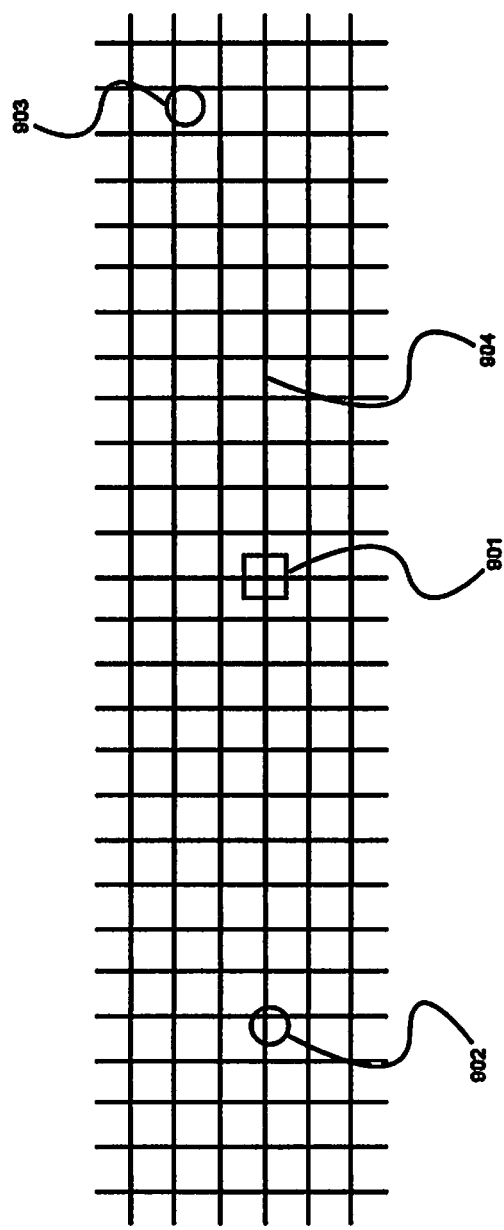
FIG. 9 is a diagram illustrating a grid of points for which reception characteristics are calculated.

FIG. 9 is an illustration a grid 904 of typically a few tens of meters on each side. Each intersection on the grid 901 represents a location for which an expected reception profile may be determined according to the method of the invention, described below. Each fingerprint available 902, 903 is associated with an intersection on grid 904.

One optional approach is to store the signal strength from an antenna as a grey-scale image or from up to three antennas at a time as the Red, Green and Blue (RGB) values in a color video image, which inherently has an X/Y grid structure that corresponds to location grid 904. This may then be efficiently processed by a graphics processor as if it were an image, and multiple such images may be overlaid by such a graphics processor so as to show a visual representation of the signal strength. The stored values in each pixel need not represent a linear or logarithmic scale of signal strength but, rather, may be arbitrarily modified as appropriate either when stored or prior to display so as to show a clearer color representation for viewing when shown on screen or in print.

Point 803 is one point on grid 904 where a power level received by a handset from a given tower may be determined. This signal level may be estimated by considering the neighboring fingerprints 810, 811, 812 and extrapolating the value obtained using antenna models, propagation models and maps describing the environment. The operation may then be repeated for each point of grid 904 in order to pre-calculate all the values and populate the entire grid. Grid 904 may be saved as an array or as a bitmap image.

Point 804 is treated in a similar way. It should be appreciated that point 804 is in the middle of a park 805 with very different radio characteristics from those within which the nearest fingerprints 813 and 814 lie (these being in residential and dense urban areas respectively).

The invention seeks to bring the predicted field strength at each point closer to the actual strength by utilizing knowledge of the nearby fingerprint(s) and the type of terrain (a) between the transmitter 801 and each fingerprint, and (b) between the transmitter 801 and the point in question. It will be appreciated that a wide range of interpolation algorithms may be applied and that the one described below is merely one example of such an algorithm.

Figure 10:
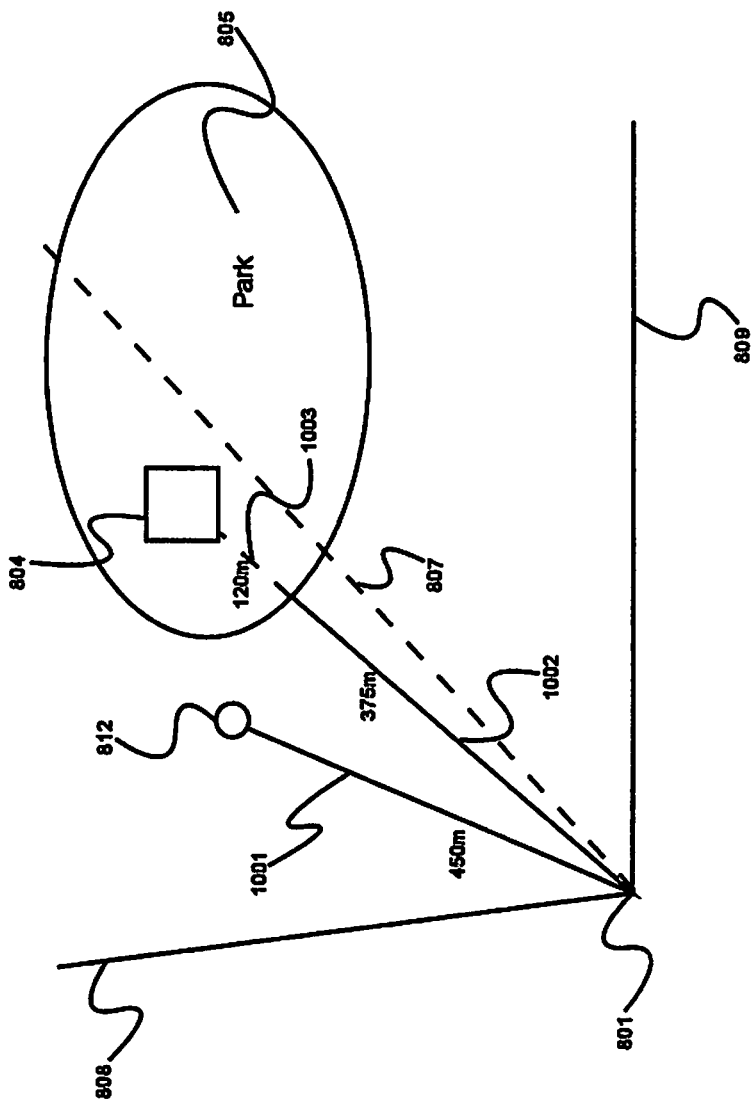
FIG. 10 is a diagram showing additional detail of some transmission paths from the scenario of FIG. 8.

FIG. 10 shows a line drawn along a (direct or "line-of-sight") transmission path between a transmitter 801 and a particular fingerprint 812 and as illustrated may cross a single type of environment (as illustrated, a residential area however it will be appreciated that the nature of the region may vary according to the invention and the use of a residential area is purely exemplary), which corresponds to a particular attenuation level. When evaluating the expected reception at a point on the grid such as a previously discussed point 804, for example, the types of environment on the line of sight from transmitter 801 to a point 804 in question may be compared. We also consider the distance the signal must travel through each type of environment.

According to the illustrated example, the path from transmitter 801 to fingerprint 812 is through a residential neighborhood for a distance 1001 of 450 m. The parameter used to represent falloff in this environment (e.g., "residential_falloff") in the predicted model may be adjusted so that the predicted reception level at 812 matches the measured path loss ("path_loss"). In this case, residential_falloff=path_loss/450 m.

However, from a transmitter 801 to point 804 on the exemplary grid (where there is no fingerprint measurement) it will be noted that the line of sight passes through the residential neighborhood for a distance of 375 m 1002 and then a green area 1003 for a distance of 120 m.

The falloff or path loss between transmitter 801 and point 804 may be calculated according to the fitted coefficients from the fingerprint multiplied by the corresponding distance:

path_loss=375 m*residential_falloff+120 m*green_falloff.

The residential_falloff has been previously calculated through the fingerprint. The green_falloff may have been calculated or could be a simple lookup to a predefined set of values.

Note that the antenna radiation pattern should also be taken into account in the calculation as the strength of signal varies with offset from the azimuth 807.

In the above example, it was straightforward to determine the residential falloff as the line of sight only covered one type of terrain. It is not much more complicated to solve simultaneous equations for multiple coefficients where the line of sight crosses more than one type of terrain. So long as there are at least as many fingerprints as there are terrain types in the cell, the coefficients can be calculated. As a table of such coefficients is available, an alternative approach is to start with the figures from the table for some or all of the coefficients. An alternative approach, which can avoid being overly influenced by outlying fingerprints (i.e., potentially erroneous or at least anomalous fingerprints) is to start with the published coefficients and to adjust these within reasonable constraints to find the best set of coefficients that match the data to hand.

The calculations just described result in a locally "correct" coefficient that should be closer to the real coefficient between transmitter 801 and other points on the grid near to fingerprint 812.

It will be appreciated that if a fingerprint 812 is sufficiently close to a point in question 804, then it should be more trusted as a reference than a fingerprint very far away. The estimated signal level at point 804 may be further refined by taking a weighted average of the results that are obtained by using each of the nearby fingerprints, as below:

Estimated_signal=
(estimated_signal_from_FP1*weight_1+
estimated_signal_from_FP2*weight_2+ . . .
)/SUM(weights)

The weights could be defined as proportional to the inverse of the distance between fingerprint and point B or by a different type of distribution. For example, how closely the terrain type on the line of sight to a fingerprint matches that to the point in question.

The influence of specific fingerprints may be further modified by one or more algorithms designed to detect and eliminate or at least reduce the impact of erroneous fingerprints. These algorithms may take into account factors such as how long ago the fingerprint was taken (new buildings or vegetation growth may change the line of sight path over time), comparison with predicted reception strength at that point (a fingerprint taken within a few meters of a base station that did not include that base station's signal would be rejected for example), or smoothing techniques.

Having estimated the signal level for each point of the grid and repeated this for each transmitter tower, this data can now be used to report the most likely location of a mobile handset for which the appropriate signal data has been collected.

It will be appreciated by one having ordinary skill in the art, that it is very common across all mobile operators that the cell tower database is inaccurate. Any given particular tower position, antenna azimuth, tilt, bandwidth, etc. may be inaccurate and this would then cause all measurements to drift. The algorithms, by comparing fingerprints against expected values from the predictive algorithms over a number of records help to highlight erroneous cell tower data and may even be used to re-estimate the correct antenna parameters. This enables the accuracy to improve but also helps the mobile operator to improve the accuracy of their cell database.

Figure 11:
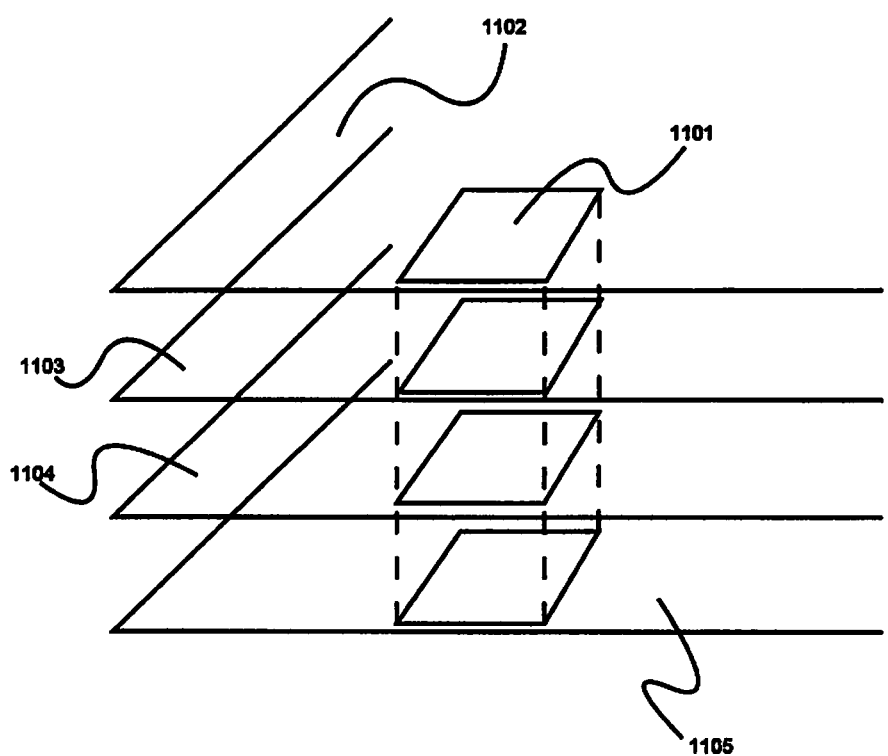
FIG. 11 is a diagram illustrating an internal representation of the grid patterns for multiple base stations.

A possible procedure is described below, referring now to FIG. 11.

First, a coarse position may be calculated using simple algorithms such as ECID (or from cell extent, antenna details, and timing information where available). This defines a bounding search area within the grid of points. The actual location should lie within that area 1101. Alternatively, it would also be possible to find the nearest matching fingerprint and use that as a starting point, and either method may be used interchangeably according to the invention. The corresponding shape 1101 is defined. Although shown here as a rectangle, the initial shape may be a sector, a polygon or even disjoint areas of any shape and size and it will be appreciated that the shapes illustrated are exemplary in nature.

The expected signal level received by a mobile device at every point on our grid for each of the transmitters in the network has already been calculated previously. It should be appreciated that the extent of the grid for each transmitter is finite. Ideally it extends as far as its signal can be received by mobile devices but this may be traded off where many grids overlap.

There is now a further bounding shape 1101 resulting from the coarse positioning method described above. From the extent of each transmitter's grid, those that overlap our bounding shape 1101 may be determined. From the grid for each tower that may be in range anywhere in 1101 a three dimensional array of expected reception strength from the grids 1102, 1103, 1104, 1105 for a plurality of towers (according to the illustrated example) may be constructed.

The method may then apply a matching algorithm such as:

$$\text{Cost}=\text{SUM}[(S\_Obs(i)-S\_database(i,x,y))^2]$$

Where:

S_Obs is the observed signal level reported by the mobile device for tower with cell id i S_database is the estimated signal level for the layer of the grid corresponding to cell id i for longitude and latitude x,y The most likely position is the point x,y which minimizes the cost function, e.g. the point with minimum difference between observed value and predicted value is the one closest to the desired result. It should be noted that a more complete cost function is recommended by the inventor and ideally should include fixed penalty terms and additional weighting factors, however the exemplary function above is sufficient for purposes of illustration of the method of the invention.

In addition to the best matching point, those points near it may also be reported, particularly where other, non-adjacent points may present a near match. Preferably, an error threshold may be set and points that are within that distance of the minimum may also be reported. Accordingly, the likely area within which a mobile device is actually located can be shown as a "heat map" or contour map showing the probability as a function of the error.

The calculation above may be performed directly using fixed size arrays, which lead to very fast computation. Image processing algorithms may also be utilized here to "crunch" the layers.

A number of optional refinements to the basic invention are described below, and it should be appreciated that such descriptions are exemplary in nature and not limiting of the invention in any way, and that other refinements or alternatives may be utilized according to the invention.

The algorithm described above not only finds the global minimum but also defines a shape representing the confidence area. If this "valley" is relatively flat, it means that the error is likely to be important. On the contrary, a deep, steep-sided valley represents a good convergence with a clear minimum and low uncertainty. Using both this information and the underlying maps, the algorithms are able to identify areas lacking fingerprints (flat valleys, heterogeneous environment) or on the contrary well covered (deep valleys). As a result, drive tests to obtain new fingerprints can be optimized in a cost effective manner.

Based on repeated location calculations in the same geographic area, repeated tower to calculated position estimate errors can be reduced by gradually adjusting the propagation models and predicted fields. The adjustment is performed over time and averaged through a large dataset. As a result, the model corrects itself to a certain extent. For example, assuming that the prediction from a tower in a particular zone is consistently overshooting compared to all the other predictions from other towers, over time, the model will be adjusted to take into account a greater attenuation and therefore slightly reduce the predicted distance from that tower.

The algorithms described above are well suited for Graphics Processing Unit (GPU) parallel computation using technologies such as CUDA, OpenCL, etc. GPUs are today widely used for scientific and engineering applications and can be directly applied to the above algorithms. Compared to a general purpose Central Processing Unit (CPU), using a high performance graphic card (such as the Nvidia® Tesla™ M series for example), acceleration can reach a factor of 10 compared to standard server CPU. This is a cost effective high performance parallel computing solution addressing the need for rapid matching algorithm execution. This architecture can be extended to contour detection (confidence area) and geo-fencing breach detection.

The measurement of signal strength from each transmitter is typically measured with fairly coarse accuracy of relatively high uncertainty or error. When the expected field in a grid cell is rounded to the available accuracy, this can result in many grid cells having the same values (particularly where the signal level is very weak right at the edges of the reception range. A non-linear grid may be used to reduce storage and computation requirements), for example by having larger grid spacing further from the transmitter.

Alternatively, the "grid" can be replaced by a "contour map" in which arbitrary areas within which the expected reception strength is constant (to within the granularity of the measuring and reporting mechanism). These are more efficient to store and transmit and may be calculated from an initial full grid calculation which is then traversed to find the extent of each contour (which may include multiple disjoint areas). A subset of the techniques used with JPEG image encoding coding may be used to reduce the size of the image in this way. Having expressed the map as a grayscale image in the first place, it is even possible to use JPEG compression directly on the image. This variably lossy compression technique provides a variable tradeoff between storage capacity and accuracy/granularity.

As discussed earlier, where three-dimensional topography information is available this can be used to refine the estimates of path loss. In this case, the height of buildings can have a significant impact on how well a loss rate determined from a fingerprint within a city will match, say, reception across the same city from the top of a hill in a park overlooking that same city (for example, where the path is downwards, through buildings from a transmitter on top of a skyscraper to someone on the street). However as the line of sight, over the city will effectively be unobstructed, it should be calculated with a different loss rate. Where ground height is known but building height is not, an estimate for the typical height of buildings within each cell may be used.

Optionally, a broader estimate of height and a function of height versus distance from the center of urban areas may be used. For example, many American cities have a relatively small grouping of skyscrapers in the city center with lower buildings around them and lower still in the suburbs.

Transmission through built up areas is complicated by reflections and multi-path transmission. This can even lead to signals being received more strongly than in open space via a "tunnel" effect. This is particularly noticeable in cities or towns built on an orthogonal grid structure. Reception will be very good when the line of sight is down an open street but much poorer where one or more blocks have to be crossed between the transmitter and the handset. This has the danger of making successive fingerprints misleading. Those taken at intersections are likely to have much higher signal levels than those in the center of blocks. When weighting the influence of fingerprints, the similarity or difference between the fingerprint and the cell being populated in the grid of estimated signal levels can be taken into account. The number of blocks in each orthogonal direction between transmitter and fingerprint or grid cell can be used in this respect. For example, a grid cell representing a point 3.5 blocks north and 1.5 blocks east of a transmitter mid-block should not rely heavily to a fingerprint half a block away from it, exactly 4 blocks north and 1 block east, on an intersection but a fingerprint 3.3 blocks north and 1.2 blocks east of the transmitter should be relied on more.

The grid nature of (in particular) U.S. cities could actually make linear distance measurement between potential location and fingerprint locations very prone to error. i.e. a fingerprint taken where there a block of buildings is in the way is very different to values half way between the two fingerprints either side of it where there is a clear line of sight almost back to the tower. This can be modeled with an angular modifier for grid-based cities. Propagation North-South and East-West may be very good while much worse at intermediate angles. In the general case, three dimensional ray tracing and casting techniques may be used to more accurately determine the appropriate path.

The received signal strength varies as a device is moved about one's body as well due to the direction and mode of travel. Taking several successive readings can lead to a more accurate estimation of location and/or velocity. For example, a device that is stationary and not in use should provide relatively stable readings of signal strength. One in use or in a pocket when someone is walking will show slowly changing signal strength except in cities where traffic passing, different buildings crossing the line of sight and walking past intersections will provide variations of characteristic frequency and amplitude.

When a mobile device is carried within a car, the signal strength will vary more rapidly, as will the hand-off rate from one cell to the next. If a device is in use within a train there will typically be periods of signal loss, such as in tunnels. Unfortunately, in such cases there is no way for the device to report this, as it has no signal. Suddenly increased delays and/or the need to retry requests for signal strength information can be used as pointers towards such events.

How a mobile device is carried and used also influences the signal strength, as will be familiar to most people who have walked to a window or turned their device to the window to try and get a better signal. A vehicle collecting fingerprint data typically has the device and data collecting equipment in a fixed position relative to a vehicle. This does not take account of the attenuation in one direction provided by a user's body when using a device or when carrying a device in a chest or trouser pocket (for example). Where the device is reporting signal strength from multiple receivers, the position of the device relative to the user's body or car or bag or other devices or anything else surrounding it could attenuate the signal from each transmitter differently.

So although the cell within our grid that represents the actual position may have a low error figure for the cell on which the device is communicating, it might have a higher error value for the towers in other directions. An enhanced matching algorithm can be defined that performs a series of "what if" analyses. By considering what the impact would be of a body being due south of the device, an alternative prediction can be made. Another can be made for a body being due west of the device, and so on. In this case, the hypothetical, "body north of device" and "body west of device" may provide a better match than the initial 360° symmetrical figure started with. This may then trigger a binary chop between those two angles. Further binary chops could be made to find the best match for the hypothesis that there is a human body next to the device. A similar approach could then be taken with a model of a car, which would attenuate the signal differently in different directions. In this case, the direction of travel, if known from successive location requests, can be used to inform the algorithm of the most likely orientation of the car and hence its impact on signals coming from different angles to its direction of travel.

A further iteration of this algorithm could be used to model use within a building from which the transmission is attenuated more in some directions than others.

The above method is easily extended to model attenuation in three dimensions. Alternatively, ray tracing can be used to identify reflections and attenuation.

Optionally, this "what if" method would only be applied if the error figure from the initial match exceeds a threshold, or if there are multiple distinct potential locations with very similar error values.

A similar algorithm can be used to compensate for the antenna characteristics of the device. Each model of device may have a particular antenna design and this can result in higher or lower received signal strength. Sometimes this can be particularly sensitive to how a device is held or used. Measurements of received signal strengths at different angles can be used to build a model of how a particular type of device would pick up signals from different directions when in use and when idle. Preferentially such models take into account whether the device is in use or idle when the signal strength measurements are made.

In many cases, the location of a mobile device is determined multiple times in fairly rapid succession in an attempt to track the changing location of the device. Where the location appears to vary (especially if the velocity indicated is greater than walking pace or in any terrain other than open country), it is highly likely that the device is being carried along streets or paths. The estimated location at any time can be enhanced by comparing the successive locations predicted by the above algorithms with the locations of nearby roads or paths and the potential routes between the original and final (or latest known) destination. As additional points are calculated, so the whole sequence of points can be more accurately estimated.

This tracking algorithm takes noisy time-stamped location estimates (such as the output from fingerprint matching or the hybrid predictive matching described above) as input and produces smooth continuous trajectories as its output. The key issues addresses by the algorithm are two-fold. Firstly, the locations predicted by fingerprint matching are not always accurate. For example, the locations of automobiles may not always be on the road and can be up to 200 meters from the actual position. Secondly, the location prediction may not always be available at the expected interval. A temporal gap in the location sequence can occur because of weak radio signals.

The tracking algorithm solves these issues based on two key techniques. Consider the moving mobile handset to be a nonlinear dynamic system and represent its state by a 4-tuple ($S=[lon_s; lat_s; vlon_s; vlat_s]$), where $lon_s$ and $lat_s$ are the longitude and latitude and $vlon_s$ and $vlat_s$ refer to the velocity along the longitude and latitude directions, respectively. The Kalman states are not observed directly, but can be estimated (filtered) by an extended Kalman filter from the noisy observations ($O=[lon_m; lat_m; vlon_m; vlat_n]$) that are calculated directly from the input. The result of this filtering is a smooth trajectory (less jumpy), but these trajectories are not necessarily located on roads.

When observations are not available, Kalman filtering can estimate the states using the estimated dynamics. For example, we may assume that the velocity is driven by a random acceleration process. This is called a time-update (or prediction) step of the Kalman filter and is useful only when the observation becomes available again in a short period. For a large temporal gap, the state of the Kalman filter can drift away. Alternatively, a particle filter or simpler moving average algorithm can be used but the Extended Kalman Filter (EKF) is particularly attractive due to the speed with which it can be calculated.

The Kalman filtering results can be further improved by using the geographical information that is available from street maps (such as OpenStreetMap). First, the filtered trajectories are "snapped" to the nearby road locations giving a number of candidate points, of which the nearest is taken by default. Previous points can then be compared with the route using a cost function such that points far off the shortest path are considered outliers and are removed.

For a large temporal gap, a routing algorithm is applied to find a likely path between the two locations and the likely location at the missing time is inferred by interpolation of points along the route.

The skilled person will be aware of a range of possible modifications of the various embodiments described above. Accordingly, the present invention is defined by the claims and their equivalents.

What is claimed is:

1. A system for determining the location of a mobile device in communication with one or more radio transmitters at known locations comprising:
   a mobile communications network;
   a plurality of network transceivers; and
   a location server;
   wherein the mobile communications network is in communication with a mobile device via the plurality of network transceivers;
   wherein the location server receives and responds to requests for location-based data pertaining to the mobile device;
   wherein the location server computes an initial estimate of a location of the mobile device using cell tower triangulation and calculates a plurality of expected reception profiles at each point in a geographic grid comprising points in a neighborhood of the initial estimated location by combining, for each geographic grid point, predicted reception at the geographic grid point with actual reception data obtained from stored radio frequency fingerprint data for a plurality of locations near the geographic grid point, the available stored radio frequency fingerprint data for each nearby location weighted based at least on a distance from the geographic grid point to a the respective nearby location;
   wherein predicted reception for each geographic grid point is based at least on a terrain type through which a signal must travel to arrive at the grid point from each network transceiver for which reception is being predicted and on network specific data;
   wherein actual reception characteristics for the mobile device are compared to the plurality of expected reception profiles for points in the geographic grid in order to determine a closest match using an error function and thereby to accurately determine a location of the mobile device.

2. The system of claim 1, further comprising:
   a data storage system;
   wherein the location server is connected to the data storage system.

3. The system of claim 2, wherein the location server stores previous location data in the data storage system.

4. The system of claim 3, wherein the location server compares stored location data to current network conditions to find a match.

5. The system of claim 4, wherein the location server operates within the mobile communications network.

6. The system of claim 4, wherein the location server operates within the mobile device.

* * * * *